US006842106B2

(12) United States Patent
Hughes et al.

(10) Patent No.: US 6,842,106 B2
(45) Date of Patent: Jan. 11, 2005

(54) CHALLENGED-BASED TAG AUTHENTICATION MODEL

(75) Inventors: Michael A. Hughes, Pasco, WA (US); Richard M. Pratt, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 154 days.

(21) Appl. No.: 10/263,635

(22) Filed: Oct. 4, 2002

(65) Prior Publication Data

US 2004/0066278 A1 Apr. 8, 2004

(51) Int. Cl.[7] .............................................. G05B 19/00
(52) U.S. Cl. ........................ 340/5.8; 340/10.1; 380/258; 380/270; 713/168
(58) Field of Search ................................ 340/10.1, 5.8, 340/572.1; 713/168–172; 380/255, 258, 270

(56) References Cited

U.S. PATENT DOCUMENTS 4,075,632 A    2/1978   Baldwin et al. ............. 343/6.8

(List continued on next page.)

FOREIGN PATENT DOCUMENTS

| DE | 43 42 641 A | 6/1995 |
| GB | 2 353 620 A | 2/2001 |
| WO | 01 59728 A | 8/2001 |

OTHER PUBLICATIONS

Finkenzeller, Klaus, "Radio–Frequency identification Fundamentals and Applications", *RFID Handbook*, Chapter 8, pp. 151–158 (Jan. 2002).

(List continued on next page.)

U.S. PATENT DOCUMENTS

| 6,177,861 | B1 |   | 1/2001  | MacLellan et al. ......... 340/10.1 |
| 6,236,315 | B1 |   | 5/2001  | Helms et al. ............. 340/572.7 |
| 6,265,962 | B1 |   | 7/2001  | Black et al. ............... 340/10.2 |
| 6,307,848 | B1 |   | 10/2001 | Wood, Jr. .................... 370/329 |
| 6,317,028 | B1 | * | 11/2001 | Valiulis ..................... 340/10.1 |
| 6,323,566 | B1 | * | 11/2001 | Meier ..................... 340/825.69 |
| 6,366,260 | B1 |   | 4/2002  | Carrender ................... 343/866 |
| 6,726,099 | B2 | * | 4/2004  | Becker et al. .............. 235/380 |
| 2002/0129246 | A1 | * | 9/2002 | Blumenau et al. .......... 713/168 |
| 2003/0018893 | A1 | * | 1/2003 | Hess et al. ................... 713/169 |
| 2003/0028787 | A1 | * | 2/2003 | Fayed et al. ................ 713/189 |
| 2003/0179078 | A1 | * | 9/2003 | Chen et al. ................ 340/10.2 |
| 2004/0049451 | A1 | * | 3/2004 | Berardi et al. ................ 705/39 |

OTHER PUBLICATIONS

International Standard, ISO/IEC, "Part 2: Mechanisms Using Symmetry Encipherment Algorithms", *Information Technology—Security Techniques—Entity Authentication*, #ISO/IEC 9798–2:1999(E), 2nd Ed., pp 1–11 (Jul. 15, 1999).

(List continued on next page.)

*Primary Examiner*—Thomas J Mullen, Jr.
(74) *Attorney, Agent, or Firm*—Wells St. John P.S.

(57) ABSTRACT

A method of securing communications in an RFID system including a reader and an RF tag having a memory configured to store information comprises sending, from the reader, a message to the tag; the tag, in response to the message, generating a challenge value and sending the challenge value to the reader; in any order: the reader performing a mathematical operation on the challenge value based upon a key value to generate a challenge reply and sending the challenge reply to the tag and the tag independently computing a challenge response based on the key value and mathematical operation; the tag comparing the challenge response computed by the tag with the challenge reply sent by the reader; and the tag authenticating the reader if the challenge response matches the challenge reply. An RFID system including an RFID tag and a reader are configured to perform the above steps.

46 Claims, 3 Drawing Sheets

U.S. PATENT DOCUMENTS

| | | | |
|---|---|---|---|
| 4,352,183 A | 9/1982 | Davis et al. | 371/33 |
| 4,360,810 A | 11/1982 | Landt | 343/6.5 |
| 5,521,601 A | 5/1996 | Kandlur et al. | 342/42 |
| 5,530,702 A | 6/1996 | Palmer et al. | 370/85.3 |
| 5,550,547 A | 8/1996 | Chan et al. | 342/42 |
| 5,649,296 A | 7/1997 | MacLellan et al. | 455/38.2 |
| 5,757,923 A | 5/1998 | Koopman, Jr. | 380/46 |
| 5,777,561 A | 7/1998 | Chieu et al. | 340/825.54 |
| 5,850,187 A | 12/1998 | Carrender et al. | 340/10.6 |
| 5,883,582 A | 3/1999 | Bowers et al. | 340/825.54 |
| 5,940,006 A | 8/1999 | MacLellan et al. | 340/825.54 |
| 5,986,570 A | 11/1999 | Black et al. | 340/825.54 |
| 5,995,019 A | 11/1999 | Chieu et al. | 340/825.54 |
| 6,091,319 A | 7/2000 | Black et al. | 340/10.2 |
| 6,130,623 A | 10/2000 | MacLellan et al. | 340/825.54 |

OTHER PUBLICATIONS

Aglient Technologies, "Schottky Diode Voltage Doubler, Application Note 956–4", 2 pages (1999).

U.S. patent appln. filed Oct. 2, 2002, entitled "Radio Frequency Identification Device Communications Systems, Wireless Communication Devices, Wireless Communication Systems, Backscatter Communication Methods, Radio Frequency Identification Device Communication Methods and a Radio Frequency Identification Device", by Michael A. Hughes and Richard M. Pratt.

U.S. patent appln. filed Oct. 2, 2002, entitled "Method of Simultaneously Reading Multiple RAdio Frequency Tags, RF Tag, and RF Reader", by Emre Ertin, Richard M. Pratt, Michael A. Hughes, Kevin L. Priddy and Wayne M. Lechelt.

U.S. patent appln. filed Oct. 2, 2002, entitled "RFID System and Method Including Tag ID Compression", by Michael A. Hughes and Richard M. Pratt.

U.S. patent appln. filed Oct. 2, 2002, entitled " System and Method to Identify Multiple RFID Tags", by Michael A. Hughes and Richard M. Pratt.

U.S. patent appln. filed Oct. 2, 2002, entitled "Radio Frequency Identification Devices, Backscatter Communication Device Wake–Up Methods, Communication Device Wake–Up Methods and a Radio Frequency Identification Device Wake–Up Method", by Richard M. Pratt and Michael A. Hughes.

U.S. patent appln. filed Oct. 2, 2002, entitled "Wireless Communication Systems, RAdio Frequency Identification Devices, Methods of Enhancing a Communications Range of a Radio Frequency Identification Device, and Wireless Communication Methods", by Richard M. Pratt and Steven B. Thompson.

U.S. patent appl. filed Oct. 2, 2002, entitled "Wireless Communications Devices, Methods of Processing a Wireless Communication Signal, Wireless Communication Synchronization Methods and a Radio Frequency Identification Device Communication Method", by Richard M. Pratt and Steven B. Thompson.

U.S. patent appln. filed Oct. 2, 2002, entitled "Wireless Communications Systems, Radio Frequency Identification Devices, Wireless Communications Methods, and Radio Frequency Identification Device Communications Methods", by Richard M. Pratt and Steven B. Thompson.

Hont, "Tiris News", Texas Instruments, Issue 19, 1999, vol. 19, Dec. 31, 1999, pp.1–12 XP002267510; retrieved from the Internet: URL:http://www.ti.com/tiris/docs/manuals/RFIDNews/Tiris_NL19.pdf, retrieved on Jan. 21, 2004.

"Tiris Automatic Recognition of Consumers: Series 5000 Reader System", Texas Instruments, XP002267280, Feb. 28, 1999, pp. 1–14, retrieved from the Internet: URL:http://www.ti.com/tiris/docs/manuals/brochures/overview.pdf. retrieved on Jan. 19, 2004.

Knebelkamp, et al., "White paper—doc center: Latest Generation Technology for Immobilizer Systems", XP002267281, retrieved from the Internet: URL:http://www.ti.com/tiris/docs/manuals/whtPapers/immobilizer.pdf, retrieved on Jan. 19, 2004.

* cited by examiner

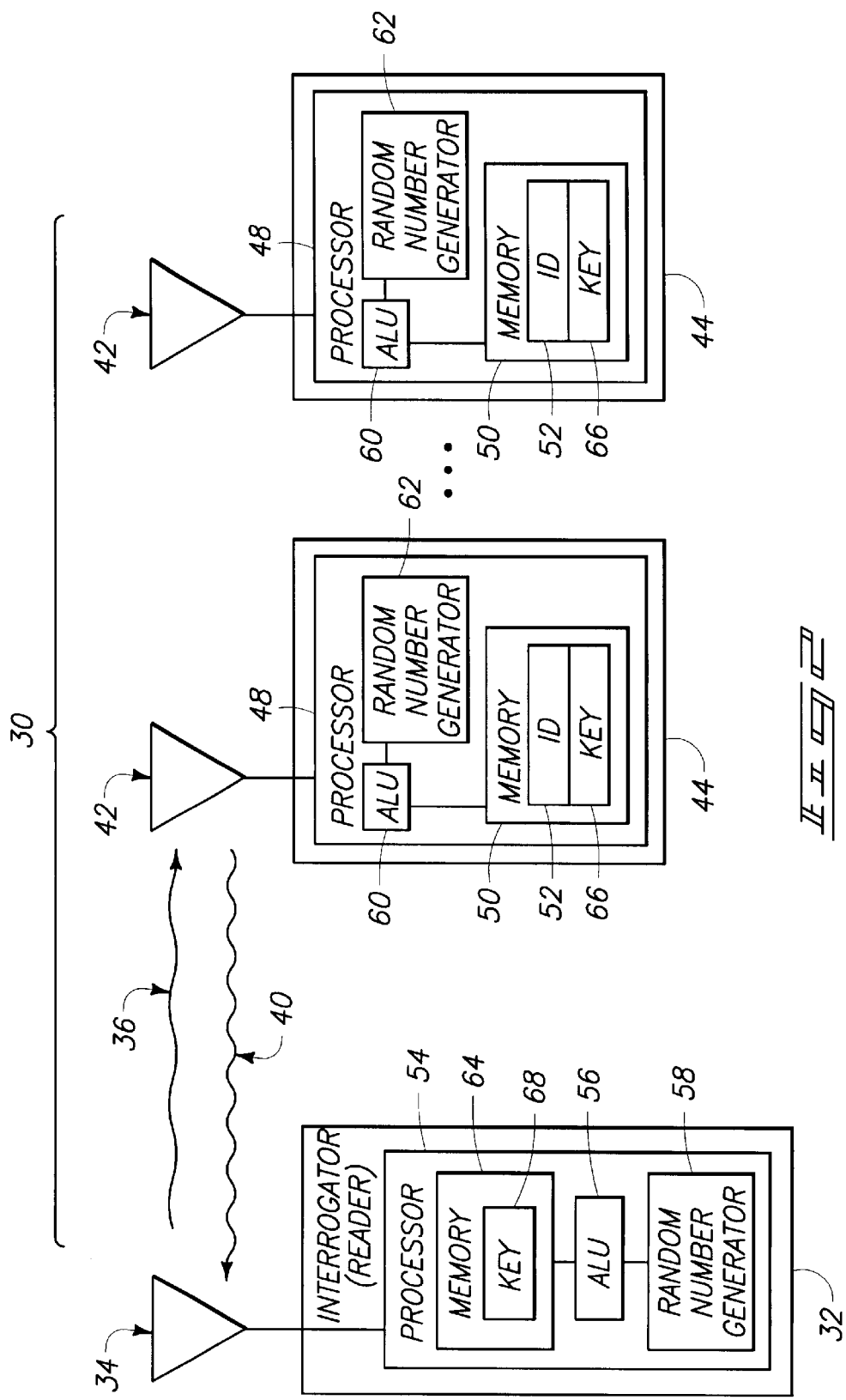

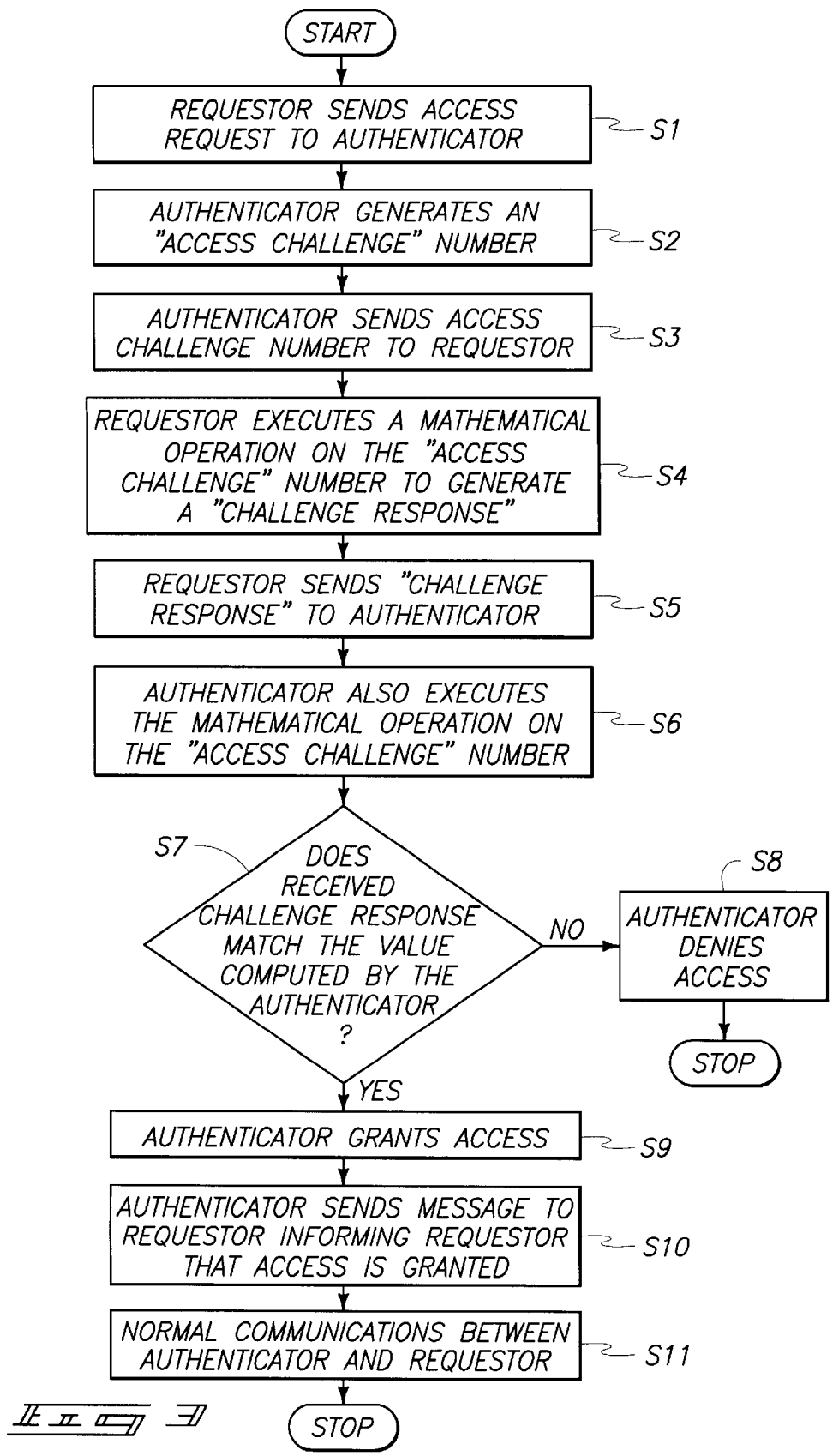

CHALLENGED-BASED TAG AUTHENTICATION MODEL

TECHNICAL FIELD

The invention relates to a remote communication system. More particularly, the invention relates to a radio frequency (RF) identification system and methods for secure communications between a RFID reader and RFID tags.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed to identify, monitor or control remote objects. As shown in FIG. 1, a basic RFID system 10 includes an interrogator 18 and transponders (commonly called RF tags) 16. The interrogator 18 includes a transceiver with decoder 14 and an antenna 12. The tag 16 includes an antenna 24. In operation, the antenna 12 emits and receives electromagnetic radio signals generated by the transceiver 14 to activate the tag 16 and receive signals from the tag. When the tag 16 is activated, data can be read from or written to the tag.

In some applications, the transceiver and antenna 12 are components of an interrogator (or reader) 18, which can be configured either as a hand-held or a fixed-mount device. The interrogator 18 emits the radio signals 20 in range from one inch to one hundred feet or more, depending upon its power output and the radio frequency used. When an RF tag 16 passes through the electromagnetic radio waves 20, the tag detects the signal 20 and is activated. Data encoded in the tag 16 is then transmitted by a modulated data signal 22 through an antenna 24 to the interrogator 18 for subsequent processing.

An advantage of RFID systems is the non-contact, non-line-of-sight capability of the technology. Tags can be read through a variety of substances such as snow, fog, ice, paint, dirt, and other visually and environmentally challenging conditions where bar codes or other optically-read technologies would be useless. RF tags can also be read at remarkable speeds, in most cases responding in less than one hundred milliseconds.

There are three main categories of RFID tag systems. These are systems that employ beam-powered passive tags, battery-powered semi-passive tags, and active tags. Each operates in fundamentally different ways. The invention described below in the Detailed Description can be embodied in any of these types of systems.

The beam-powered RFID tag is often referred to as a passive device because it derives the energy needed for its operation from the radio frequency energy beamed at it. The tag rectifies the field and changes the reflective characteristics of the tag itself, creating a change in reflectivity that is seen at the interrogator. A battery-powered semi-passive RFID tag operates in a similar fashion, modulating its RF cross-section in order to change its reflectivity that is seen at the interrogator to develop a communication link. Here, the battery is the only source of the tag's operational power. Finally, in the active RFID tag, both the tag and reader have transceivers to communicate and are powered by a battery.

A typical RF tag system 10 will contain at least one tag 16 and one interrogator 18. The range of communication for such tags varies according to the transmission power of the interrogator 18 and the tag 16. Battery-powered tags operating at 2,450 MHz have traditionally been limited to less than ten meters in range. However, devices with sufficient power can reach in excess of 100 meters in range, depending on the frequency and environmental characteristics.

Conventional RF tag systems utilize continuous wave backscatter to communicate data from the tag 16 to the interrogator 18. More specifically, the interrogator 18 transmits a continuous-wave radio signal to the tag 16, which modulates the signal 20 using modulated backscattering wherein the electrical characteristics of the antenna 24 are altered by a modulating signal from the tag that reflects a modulated signal 22 back to the interrogator 18. The modulated signal 22 is encoded with information from the tag 16. The interrogator 18 then demodulates the modulated signal 22 and decodes the information.

Conventional continuous wave backscatter RF tag systems utilizing passive (no battery) RF tags require adequate power from the signal 20 to power the internal circuitry in the tag 16 used to modulate the signal back to the interrogator 18. While this is successful for tags that are located in close proximity to an interrogator, for example less than three meters, this may be insufficient range for some applications, for example greater than 100 meters.

A problem in RFID systems is in authentication and secure communications between the reader and RF tags in the field of view of the reader.

SUMMARY OF THE INVENTION

One aspect of the invention provides a method and apparatus for authenticating a reader or tags over a public, open channel. Another aspect of the invention provides a method and apparatus that is more robust against spoofing and other illicit access attempts than password-based methods.

The invention provides a method of securing communications in an RFID system including a reader and an RF tag having a memory configured to store information, the method comprising: sending, from the reader, a message to the tag; the tag, in response to the message, generating a challenge value and sending the challenge value to the reader; in any order: the reader performing a mathematical operation on the challenge value based upon a key value to generate a challenge reply and sending the challenge reply to the tag and the tag independently computing a challenge response based on the key value and mathematical operation; the tag comparing the challenge response computed by the tag with the challenge reply send by the reader; and the tag authenticating the reader if the challenge response matches the challenge reply.

Another aspect of the invention provides a method of securing communications in an RFID system including a reader and an RF tag having a memory configured to store information, the method comprising: sending, from the tag, a message to the reader; the reader, in response to the message, generating a challenge value and sending the challenge value to the tag; in any order: the tag performing a mathematical operation on the challenge value based upon a key value to generate a challenge reply and sending the challenge reply to the reader and the reader independently computing a challenge response based on the key value and mathematical operation; the reader comparing the challenge response computed by the reader with the challenge reply sent by the tag; and the reader authenticating the tag if the challenge response matches the challenge reply.

An RFID communications system comprising: an RF tag having a memory configured to store information; and a reader configured to send a message to the tag; the tag being configured to, in response to the message, generate a challenge value and send the challenge value to the reader; the reader being configured to perform a mathematical operation on the challenge value based upon a key value to generate a challenge reply and send the challenge reply to the tag; the tag being further configured to independently compute a challenge response based on the key value and mathematical operation, to compare the challenge response computed by the tag with the challenge reply sent by the reader, and to authenticate the reader if the challenge response matches the challenge reply.

An RFID communications system comprising: an RF tag having a memory configured to store information; and a reader configured for RF communication with the tag, the tag being configured to send a message to the reader; the reader being configured to, in response to the message, generate a challenge value and send the challenge value to the tag; the tag being configured to perform a mathematical operation on the challenge value based upon a key value to generate a challenge reply and send the challenge reply to the reader; the reader being further configured to independently compute a challenge response based on the key value and mathematical operation, to compare the challenge response computed by the reader with the challenge reply sent by the tag, and to authenticate the tag if the challenge response matches the challenge reply.

A method of securing communications in an RFID system including a reader and an RF tag having a memory configured to store information, the method comprising the following steps: sending, from the tag, a message to the reader; the reader, in response to the message, generating a challenge value and sending the challenge value to the tag; the reader independently computing a challenge response based on the key value and mathematical operation; the tag performing a mathematical operation on the challenge value based upon a key value to generate a challenge reply and sending the challenge reply to the reader; the reader directly comparing the challenge response computed by the reader with the challenge reply sent by the tag, without a need to first perform a mathematical operation on the challenge reply; and the reader authenticating the tag if the challenge response matches the challenge reply.

An RFID communications system comprising: an RF tag having a memory configured to store information; and a reader configured for RF communication with the tag, the tag being configured to send a message to the reader, the reader being further configured to, in response to the message: generate a challenge value and send the challenge value to the tag, the tag being further configured to perform a mathematical operation on the challenge value based upon a key value to generate a challenge reply and send the challenge reply to the reader; independently compute a challenge response based on the key value and mathematical operation prior to receiving the challenge reply from the tag; directly compare the challenge response computed by the reader with the challenge reply sent by the tag without a need to first perform a mathematical operation on the challenge reply sent by the tag; and authenticate the tag if the challenge response matches the challenge reply.

BRIEF DESCRIPTION OF THE DRAWINGS

Preferred embodiments of the invention are described below with reference to the following accompanying drawings.

FIG. 2 is a block diagram of an RFID communication system, including a tag and reader, embodying various aspects of the invention.

FIG. 3 is a flowchart illustrating steps performed by the tag and reader of FIG. 2.

DETAILED DESCRIPTION OF THE PREFERRED EMBODIMENTS

Figure 1:
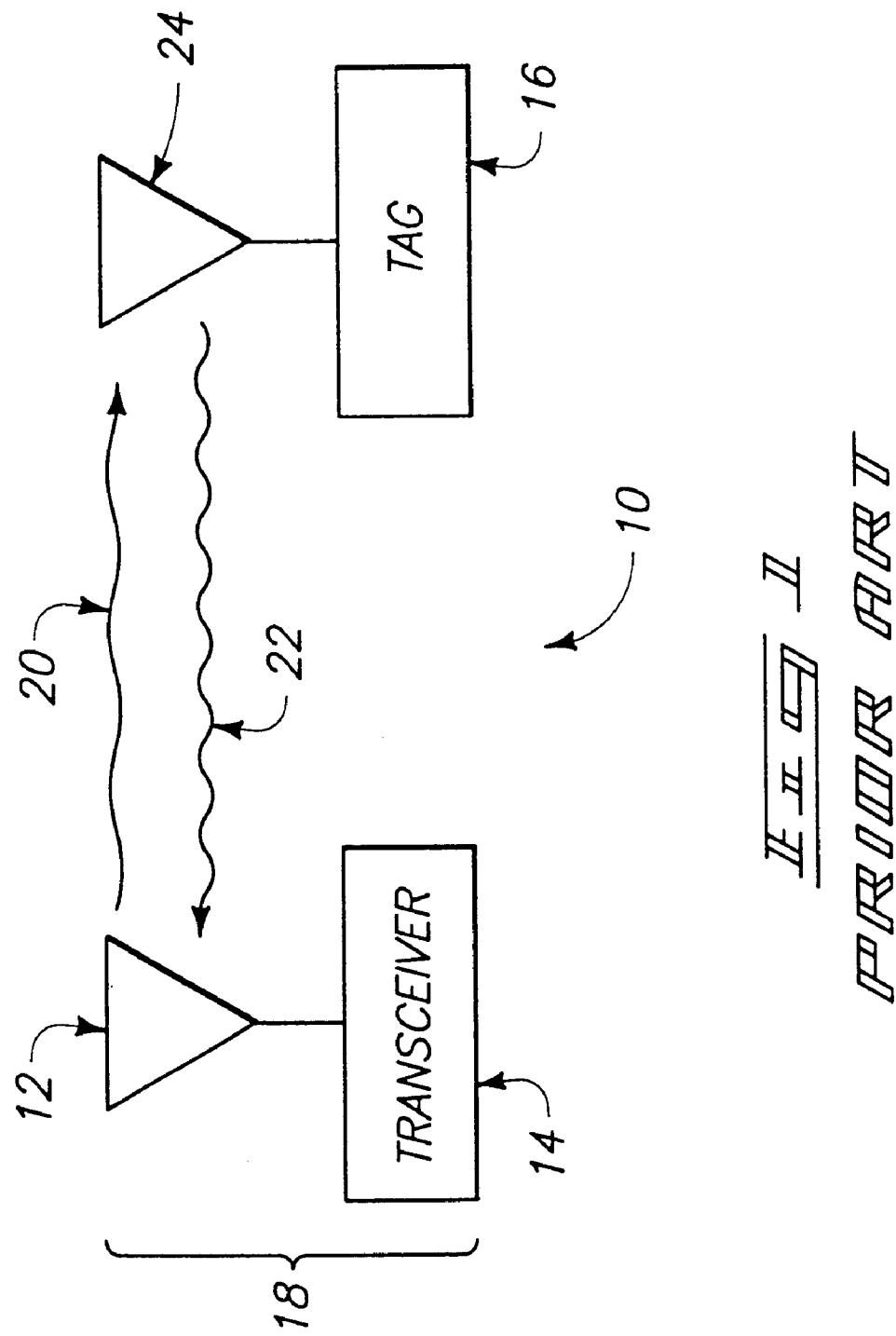
FIG. 1 is a block diagram of a conventional RFID communication system, including a tag and reader in which the invention could be incorporated.

Attention is directed to the following commonly assigned applications, which are incorporated herein by reference: U.S. patent application Ser. No. 10/263,826 entitled "Radio Frequency Identification Device Communications Systems, Wireless Communication Devices, Wireless Communication Systems, Backscatter Communication Methods, A Radio Frequency Identification Device and A Radio Frequency Identification Device Communication Method" by inventors Mike A. Hughes and Richard M. Pratt; U.S. patent application Ser. No. 10/263,809, entitled "Method of Simultaneously Reading Multiple Radio Frequency Tags, RF Tag, and RF Reader", by inventors Emre Ertin, Richard M. Pratt, Mike A. Hughes, Kevin L. Priddy, and Wayne M. Lechelt; U.S. patent application Ser. No. 10/263,873, entitled "RFID System and Method Including Tag ID Compression", by inventors Mike A. Hughes and Richard M. Pratt; U.S. patent application Ser. No. 10/264,078, entitled "System and Method to Identify Multiple RFID Tags", by inventors Mike A. Hughes and Richard M. Pratt; U.S. patent application Ser. No. 10/263,940, entitled "Wireless Communication Devices, Radio Frequency Identification Devices, Backscatter Communication Device Wake-Up Methods, Communication Device Wake-Up Methods and A Radio Frequency Identification Device Wake-Up Method", by inventors Richard Pratt and Mike Hughes; U.S. patent application Ser. No. 10/263,997, entitled "Wireless Communication Systems, Radio Frequency Identification Devices, Methods of Enhancing a Communications Range of a Radio Frequency Identification Device, and Wireless Communication Methods", by inventors Richard Pratt and Steven B. Thompson; U.S. patent application Ser. No. 10/263,670, entitled "Wireless Communications Devices, Methods of Processing a Wireless Communication Signal, Wireless Communication Synchronization Methods and a Radio Frequency Identification Device Communication Method", by inventors Richard M. Pratt and Steven B. Thompson; U.S. patent application Ser. No. 10/263,656, entitled "Wireless Communications Systems, Radio Frequency Identification Devices, Wireless Communications Methods, and Radio Frequency Identification Device Communications Methods", by inventors Richard Pratt and Steven B. Thompson; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802,408, filed Mar. 9, 2001, entitled "Multi-Level RF Identification System", now U.S. Pat. No. 6,765,476; by inventors R. W. Gilbert, G. A. Anderson, and K. D. Steele; U.S. patent application Ser. No. 09/833,465, filed Apr. 11, 2001, entitled "System and Method for Controlling Remote Device", by inventors C. L. Carrender, R. W. Gilbert, J. W. Scott, and D. Clark; U.S. patent application Ser. No. 09/588, 997, filed Jun. 6, 2000, entitled "Phase Modulation in RF Tag", by inventors R. W. Gilbert and C. L. Carrender; U.S. patent application Ser. No. 09/589,000, filed Jun. 6, 2000, entitled "Multi-Frequency Communication System and Method", by inventors R. W. Gilbert and C. L. Carrender, now U.S. Pat. No. 6,745,008; U.S. patent application Ser. No. 09/588,998, filed Jun. 6, 2000, entitled "Distance/ Ranging by Determination of RF Phase Delta", by inventor C. L. Carrender; U.S. patent application Ser. No. 09/797, 539, filed Feb. 28, 2001, entitled "Antenna Matching Circuit", by inventor C. L. Carrender, now U.S. Pat. No. 6,738,025; U.S. patent application Ser. No. 09/833,391, filed Apr. 11, 2001, entitled "Frequency Hopping RFID Reader", by inventor C. L. Carrender.

As shown in FIG. 2, an embodiment of the present invention is directed to an RF communication system 30 that employs backscatter signals. The RF communication system 30 includes a reader or interrogator 32 that includes an antenna 34 through which the reader can transmit an interrogation signal 36 to an RF tag 44. The RF tag modulates the continuous wave interrogation signal 36 to produce a backscatter response signal 40 that is transmitted back to the interrogator 32. The signal 40 can include an identification code stored in memory 50, or other data. While FIG. 2 shows only two tags 44, there would typically be multiple tags 44 in use, capable of communicating with the reader 32.

In the embodiment shown in FIG. 2, the RF tag 44 includes an antenna 42 coupled to a modulator defined by processor 48. The tag 44 includes a switch coupled between the antenna 42 and processor 48. In the embodiment of FIG. 2, the switch is included in the processor 48. Alternatively, the switch can be a switch external to the processor 48, such as an n-channel MOS transistor, a p-channel MOS transistor, a bi-polar transistor, or any of numerous other types of switches.

In FIG. 2, a modulating signal from the processor 48 is input to the antenna 42 to cause the antenna to alternately reflect or not reflect. One item that can be transmitted from the tag to the reader is an identification code that is stored in memory 50 of the RF tag 44. In one embodiment, after receiving a command, the reader sends a carrier wave or interrogation signal 36 that is received by the antenna 42, and that signal is selectively reflected or not reflected back by the antenna 42 by the tag 44 shorting or not shorting dipole halves of the antenna 42 to produce portions of the response signal 40 (backscatter communications). Other communication methods are possible.

It will be appreciated that the depiction of the RF tag 44 in FIG. 2 is one embodiment only; RFID tags are well-known in the art. For example, U.S. Pat. No. 4,075,632 to Baldwin et al., which is incorporated herein by reference, discusses in detail circuit structures that could be used to produce the RF tag 44, if modified as described below.

Similarly, the internal structures of the interrogator 32 are not shown in FIG. 2. For example, the interrogator 32 can be the receiver described in U.S. Pat. No. 4,360,810 to Landt, which is incorporated herein by reference, modified as described below.

In the illustrated embodiment, the reader 32 includes a processor 54, which in turn includes an arithmetic logic unit (ALU) 56 and a random number generator 58. The processor 54 further includes a memory 64; alternatively, the reader 32 includes a memory separate from the processor 54. The memory 64 stores a secret key value 68, the use of which will be described in greater detail below. The memory 50 of each tag 44 also stores a secret key value 66 which, in the illustrated embodiment, is the same value as the key value 68.

The processor 54 includes other features typically included in processors of the type typically employed in RFID readers. In one embodiment, the random number generator 58 actually generates pseudo random numbers; i.e., the numbers generated may follow a pattern that could be recreated. While the random number generator 58 is shown as being separate from the ALU 56, in one embodiment, the random number generator 58 is defined in part by the ALU 56. Similarly, each of the RF tags 44 is shown as including an arithmetic logic unit (ALU) 60 and a random number generator 62. Depending on whether the tags 44 or the reader 32 will be the authenticator (as will be described below), the random number generator may be omitted from either the RF tags 44 or from the reader 32.

FIG. 3 is a flowchart illustrating steps performed by the tag and reader of FIG. 2. Aspects of the invention that will be described in connection with FIG. 3 can be embodied in methods and apparatus employing tags of varying levels of sophistication. Multiple IF frequencies or read-while-write capability are not required. An advantage is that the amount of communication between the reader and the tags is minimized. This is useful to increase the speed of discovering the identities of tags.

Aspects of the invention described in connection with FIG. 3 also provide authentication (identity verification) over a public, open channel. This method can be used by the tag to authenticate the reader, or by the reader to authenticate the tag.

All participants in the authentication perform long, logical mathematical operations. More particularly, in step S1, the Requestor device requesting access (can be either a tag or the reader) sends a message to the Authenticator. In one embodiment, the Requestor is a tag 44 and the Authenticator is the reader 32. In another embodiment, the Requestor is the reader 32 and the Authenticator is a tag 44.

In step S2, the Authenticator generates an "Access Challenge" number. More particularly, in one embodiment, the "Access Challenge" number is a pseudo random number generated by the random number generator 58 or 62. Still more particularly, in one embodiment, the "Access Challenge" value is a long binary value, which is randomly generated. The length can be 128 bits, 256 bits, 512 bits, or any desired value selected depending on the desired security level versus cost and processing time.

In step S3, the Authenticator sends the "Access Challenge" number or value to the Requestor.

In step S4, the Requestor performs a long mathematical operation (or series of mathematical operations) on the "Access Challenge" number based upon the secret key value 66 or 68 (see FIG. 2) to define a "Challenge Response."

In step S5, the Requestor replies to the Authenticator with a "Challenge Response".

In step S6, the Authenticator independently computes its own "Challenge Response" by performing the same mathematical operation of step S4 that the Requestor performed and by using the same key value that the Requestor performed. Step S6 could be performed after step S1 and before step S2, simultaneously with step S2, or at any time between step S1 and step S7.

In step S7, the Authenticator compares the received "Challenge Response" from the Requestor matches the value computed by the Authenticator. If not, the Authenticator denies access in step S8. If so, the Authenticator grants access in step S9.

In step S10, the Authenticator sends a message to the Requestor informing the Requestor that access is granted. After step S10, normal communications occur in step S11, including transmission of information stored in the Authenticator to the Requestor (e.g., identification information, account information, financial information, etc.).

This is similar to the approach used in prior hardware based "dongle" designs, which were used in the past to prevent software piracy, except in a completely different field of use and without requiring a traditional dongle.

The advantages of this approach include:

(1) The "Access Challenge" number is a generally random number;

(2) The response to the Access Challenge is dependent upon the Challenge value, but is convoluted to obscure the key value.

(3) Multiple key values are possible, which can uniquely identify the user.

(4) The length of the keys and challenge values can be configured to the security requirement at hand.

Tradeoffs can be made between level of security and system cost. Greater security requires longer keys, longer messages, and more processor power.

(5) The approach of FIG. 3 is used to generate encryption values for a data stream, in an alternative embodiment. The challenge response is not transmitted, but is used to encrypt the data stream.

This approach can be implemented in a passive or semi-passive RFID application to provide a level of security and/or data encryption not presently available. The passive or semi-passive RFID application will require that the Authenticator initiate all communication processes with the Requestors. Various embodiments of the invention could be employed in security and inventory management applications.

In another embodiment, public key encryption is used. Reader authentication occurs as follows. The reader requests to read or write tag data. The tag responds with a challenge value (random number). The reader encrypts the challenge value using its private key. The reader sends the encrypted challenge response to the tag. The tag uses the reader public key to decrypt the challenge response. The tag compares the results to the original challenge value and, if there is a match, the reader is authenticated.

The process for a tag authentication is as follows. The reader issues a request to a tag including a non-encrypted challenge value. The tag encrypts the challenge value using its private key, creating a challenge response. The tag sends the challenge response to the reader (no key is sent). The reader decrypts the challenge response using the known tag's public key. If the reader-computed result matches the original challenge value, the tag is authenticated.

In another embodiment related to those just described, both a tag and a reader function to authenticate the other. For example, a reader sends a non-encrypted first challenge value to a tag. The tag encrypts the first challenge value using a tag private key and sends it to the reader, as a first response, along with a non-encrypted second challenge value. The reader decrypts the first response using a tag public key, and compares the result with the non-encrypted first challenge value. If the comparison is valid, then the tag is determined to be authentic. The reader then encrypts the second challenge value using a reader private key and sends it to the tag as a second response. The tag then decrypts the second response using a reader public key, and compares the result with the non-encrypted second challenge value. If the comparison in valid, then the reader is also determined to be authentic. The tag and the reader may now continue with the exchange of data or commands.

In the embodiments just described above, it is assumed that both the reader and the tag(s) know the public key or keys of the other, in advance of the authentication process. This is a valid assumption if both (all) belong to the same application. In addition, multiple keys (public and private) may be used to realize corresponding level of security. Generally, the longer (i.e., more complex) the key length, the greater the level of security within the exchange. In the example just described, the non-encrypted first and second challenge values may be the same; responses would be different due to different private keys. Other embodiments using public and private keys are also possible.

Inventory management incorporates a wide variety of situations where RF tags can be used. These situations include the simple inventory/locating task of critical or high value items in storage, transport, or final use locations. Integrating authentication capability into the tags as described above would greatly increase the security of data contained within the tag and the item to which it is attached. Any design of RF tag can be used for security purposes. The addition of authentication capability described above provides an additional mechanism against spoofing. The security needs are many, with potential theft being high on the list. The traditional means of detecting when a theft has occurred is to track inventory. Items can be identified as they are removed from a monitored area or when subsequent inventories are made of the storage location.

Thus, methods and apparatus for authenticating reader or tags over a public, open channel have been provided. A system has been provided that is more robust against spoofing and other illicit access attempts than password-based methods.

Implementation requires minor changes to existing designs and is, for some embodiments, a matter of implementation in the RF tags' and readers' microprocessors.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of securing communications in an RFID system including a reader and an RF tag having a memory configured to store information, the method comprising:

sending, from the reader, a message to the tag;

the tag, in response to the message, generating a challenge value and sending the challenge value to the reader;

in any order:

the reader performing a mathematical operation on the challenge value based upon a key value, stored in the reader to generate a challenge reply and sending the challenge reply to the tag; and prior to receiving the challenge reply from the reader, the tag independently computing a challenge response based on an identical key value and mathematical operation stored in the tag;

the tag comparing the challenge response computed by the tag with the challenge reply sent by the reader; and the tag authenticating the reader if the challenge response matches the challenge reply.

2. A method of securing communications in an RFID system in accordance with claim 1 wherein sending, from the reader, a message to the tag comprises sending a command requesting access to the information in the memory.

3. A method of securing communications in an RFID system in accordance with claim 1 wherein sending, from the reader, a message to the tag comprises sending a command requesting commencement of an authentication procedure.

4. A method of securing communications in an RFID system in accordance with claim 1 wherein the challenge value is a pseudo random value.

5. A method of securing communications in an RFID system in accordance with claim 1 wherein the challenge value is a long binary value.

6. A method of securing communications in an RFID system in accordance with claim 1 wherein the challenge value is a binary value of over 128 bits.

7. A method of securing communications in an RFID system in accordance with claim 1 wherein the challenge value and challenge response are calculated by performing a plurality of mathematical operations.

8. A method of securing communications in an RFID system including a reader and an RF tag having a memory configured to store information, the method comprising:

sending, from the tag, a message to the reader;

the reader, in response to the message, generating a challenge value and sending the challenge value to the tag;

in any order:

the tag performing a mathematical operation on the challenge value based upon a key value to generate a challenge reply and sending the challenge reply to the reader; and prior to receiving the challenge reply from the tag, the reader independently computing a challenge response based on the key value and mathematical operation;

the reader comparing the challenge response computed by the reader with the challenge reply sent by the tag; and the reader authenticating the tag if the challenge response matches the challenge reply.

9. A method of securing communications in an RFID system in accordance with claim 8 wherein sending, from the tag, a message to the reader comprises sending a command requesting access to the information in the memory.

10. A method of securing communications in an RFID system in accordance with claim 8 wherein sending, from the tag, a message to the reader comprises sending a command requesting commencement of an authentication procedure.

11. A method of securing communications in an RFID system in accordance with claim 8 wherein the challenge value is a pseudo random value.

12. A method of securing communications in an RFID system in accordance with claim 8 wherein the challenge value is a long binary value.

13. A method of securing communications in an RFID system in accordance with claim 8 wherein the challenge value is a binary value of over 128 bits.

14. A method of securing communications in an RFID system in accordance with claim 8 wherein the challenge value and challenge response are calculated by performing a plurality of mathematical operations.

15. An RFID communications system comprising:

an RF tag having a memory configured to store information; and a reader configured to send a message to the tag; the tag being configured to, in response to the message, generate a challenge value and send the challenge value to the reader; the reader being configured to perform a mathematical operation on the challenge value based upon a key value to generate a challenge reply and send the challenge reply to the tag; the tag being further configured to independently compute a challenge response based on the key value and mathematical operation prior to receiving the challenge reply from the reader, to compare the challenge response computed by the tag with the challenge reply sent by the reader, and to authenticate the reader if the challenge response matches the challenge reply.

16. An RFID communications system in accordance with claim 15 wherein the message the reader is configured to send to the tag comprises a command requesting access to the information in the memory.

17. An RFID communications system in accordance with claim 15 wherein the message the reader is configured to send to the tag comprises a command requesting commencement of an authentication procedure.

18. An RFID communications system in accordance with claim 15 wherein the tag includes a random number generator and wherein the challenge value is a random value.

19. An RFID communications system in accordance with claim 15 wherein the challenge value is a long binary value.

20. An RFID communications system in accordance with claim 15 wherein the challenge value is a binary value of over 128 bits.

21. An RFID communications system in accordance with claim 15 wherein the challenge value and challenge response are calculated by performing a plurality of mathematical operations.

22. An RFID communications system comprising:

an RF tag having a memory configured to store information; and a reader configured for RF communication with the tag, the tag being configured to send a message to the reader; the reader being configured to, in response to the message, generate a challenge value and send the challenge value to the tag; the tag being configured to perform a mathematical operation on the challenge value based upon a key value to generate a challenge reply and send the challenge reply to the reader; the reader being further configured to independently compute a challenge response based on the key value and mathematical operation prior to receiving the challenge reply from the tag, to compare the challenge response computed by the reader with the challenge reply sent by the tag, and to authenticate the tag if the challenge response matches the challenge reply.

23. An RFID communications system in accordance with claim 22 wherein the message the tag is configured to send to the reader comprises a command requesting access to the information in the memory.

24. An RFID communications system in accordance with claim 22 wherein the message the tag is configured to send to the reader comprises a command requesting commencement of an authentication procedure.

25. An RFID communications system in accordance with claim 22 wherein the reader includes a random number generator and wherein the challenge value is a random value.

26. An RFID communications system in accordance with claim 22 wherein the challenge value is a long binary value.

27. An RFID communications system in accordance with claim 22 wherein the challenge value is a binary value of over 128 bits.

28. An RFID communications system in accordance with claim 22 wherein the challenge value and challenge response are calculated by performing a plurality of mathematical operations.

29. A method of securing communications in an RFID system including a reader and an RF tag having a memory configured to store information, the method comprising the following steps, in order:

sending, from the tag, a message to the reader;

the reader, in response to the message, generating a challenge value, independently computing a challenge response based on the key value and mathematical operation, and sending the challenge value to the tag;

the tag performing a mathematical operation on the challenge value based upon a key value to generate a challenge reply and sending the challenge reply to the reader;

the reader directly comparing the challenge response computed by the reader with the challenge reply sent by the tag, without first performing a mathematical operation on the challenge reply; and the reader authenticating the tag if the challenge response matches the challenge reply.

30. A method of securing communications in an RFID system in accordance with claim 29 wherein sending, from the tag, a message to the reader comprises sending a command requesting access to the information in the memory.

31. A method of securing communications in an RFID system in accordance with claim 29 wherein the challenge value is a pseudo random value.

32. A method of securing communications in an RFID system in accordance with claim 29 wherein the challenge value is a long binary value.

33. A method of securing communications in an RFID system in accordance with claim 29 wherein the challenge value is a binary value of over 128 bits.

34. A method of securing communications in an RFID system in accordance with claim 29 wherein the challenge value and challenge response are calculated by performing a plurality of mathematical operations.

35. A method of securing communications in an RFID system in accordance with claim 29 wherein the sendings between the tag and the reader include RF backscatter communication.

36. An RFID reader for use with an RF tag having a memory configured to store information and configured to send an authentication request to the reader, the reader being configured to, in response to the request:
generate a challenge value and send the challenge value to the tag, and wait for the tag to perform a mathematical operation on the challenge value based upon a key value to generate a challenge reply and to send the challenge reply to the reader;
independently compute a challenge response based on the key value and mathematical operation prior to receiving the challenge reply from the tag;
compare the challenge response computed by the reader with the challenge reply sent by the tag without performing a mathematical operation on the challenge reply sent by the tag prior to the comparing; and
authenticate the tag if the challenge response matches the challenge reply.

37. An RFID communications system in accordance with claim 36 wherein the message the tag is configured to send to the reader comprises a command requesting access to the information in the memory.

38. An RFID communications system in accordance with claim 36 wherein the message the tag is configured to send to the reader comprises a command requesting commencement of an authentication procedure.

39. An RFID communications system in accordance with claim 36 wherein the reader includes a random number generator and wherein the challenge value is a random value.

40. An RFID communications system in accordance with claim 36 wherein the challenge value is a long binary value.

41. An RFID communications system in accordance with claim 36 wherein the challenge value is a binary value of over 128 bits.

42. An RFID communications system in accordance with claim 36 wherein the challenge value and challenge response are calculated by performing a plurality of mathematical operations.

43. An RFID communications system in accordance with claim 36 wherein the RF communication between the tag and the reader includes RF backscatter communication.

44. A method of securing communications in an RFID system including a reader and an RF tag, the method comprising the following steps:
sending, from the reader, a request to the tag;
the tag, in response to the request, generating and sending a challenge value to the reader;
the reader performing a mathematical operation on the challenge value using a reader private key value to generate an encrypted challenge reply and sending the encrypted challenge reply to the tag;
the tag performing a mathematical operation on the encrypted challenge reply using a reader public key value to generate a decrypted response;
the tag comparing the decrypted response with the challenge value; and
the tag authenticating the reader if the decrypted response matches the challenge value.

45. A method of securing communications in an RFID system including a reader and an RF tag, the method comprising the following steps:
the reader generating a non-encrypted challenge value;
the reader sending a request, including the challenge value, to the tag;
the tag, in response to the request, performing a mathematical operation on the challenge value using a tag private key value to generate an encrypted challenge reply and sending the encrypted challenge reply to the reader;
the reader performing a mathematical operation on the encrypted challenge reply using a tag public key value to generate a decrypted response;
the reader comparing the decrypted response with the challenge value; and
the reader authenticating the tag if the decrypted response matches the challenge value.

46. A method of securing communications in an RFID system including a reader and an RF tag, the method comprising the following steps:
the reader generating a non-encrypted first challenge value;
the reader sending a request, including the first challenge value, to the tag;
the tag, in response to the request, performing a mathematical operation on the first challenge value using a tag private key value to generate an encrypted first challenge reply;
the tag generating a non-encrypted second challenge value, and sending the first challenge reply and the second challenge value to the reader;
the reader performing a mathematical operation on the first challenge reply using a tag public key value to generate a decrypted first response;
the reader comparing the first response with the first challenge value and authenticating the tag if the first response matches the first challenge value;
the reader performing a mathematical operation on the second challenge value using a reader private key value to generate an encrypted second challenge reply and sending the second challenge reply to the tag;
the tag performing a mathematical operation on the second challenge reply using a reader public key value to generate a decrypted second response; and
the tag comparing the second response with the second challenge value and authenticating the reader if the second response matches the second challenge value.

* * * * *